(12) United States Patent
Young

(10) Patent No.: US 6,360,863 B1
(45) Date of Patent: Mar. 26, 2002

(54) CLUTCHES

(75) Inventor: Alastair John Young, Kenilworth (GB)

(73) Assignee: Automotive Products UK Limited, Leamington SPA (GB)

( * ) Notice: Subject to any disclaimer, the term of this patent is extended or adjusted under 35 U.S.C. 154(b) by 0 days.

(21) Appl. No.: 09/485,208

(22) PCT Filed: May 28, 1999

(86) PCT No.: PCT/GB99/01703

§ 371 Date: Feb. 4, 2000

§ 102(e) Date: Feb. 4, 2000

(87) PCT Pub. No.: WO99/64759

PCT Pub. Date: Dec. 16, 1999

(30) Foreign Application Priority Data

Jun. 6, 1998 (GB) .............................................. 9812149

(51) Int. Cl.$^7$ .............................................. F16D 25/08
(52) U.S. Cl. .............................. 192/85 CA; 192/91 A; 192/30 V
(58) Field of Search .......................... 192/85 CA, 91 A, 192/30 V; 92/117 K

(56) References Cited

U.S. PATENT DOCUMENTS 4,448,294 A * 5/1984 Brandenstein et al. .... 192/30 V
4,456,111 A * 6/1984 Limbacher ............. 192/85 CA
5,452,781 A * 9/1995 Eckel ....................... 192/30 V

* cited by examiner

Primary Examiner—Richard M. Lorence
Assistant Examiner—Saúl Rodrìgues
(74) Attorney, Agent, or Firm—Paul E Milliken; Ray L. Weber

(57) ABSTRACT

A clutch assembly (10) comprising a clutch cover (11), a pressure plate (12) mounted to the cover, a diaphragm spring (13) biasing the pressure plate away from the cover to engage the clutch, a lever (14) for releasing the clutch and a hydraulic slave cylinder (15) mounted on the cover via a support bearing (21) for movement of the lever to release the clutch. A vibration isolating member (29) such as a layer of polymeric material (29) on a race (22) of the support bearing (21) is provided between the support bearing and the slave cylinder. The race (22) of the support bearing (21) is connected to a piston (17) of the slave cylinder slidably received in an annular bore (19) in a housing (20) of the cylinder to define a working chamber (25). The housing (20) is connected with the lever (14) so that pressurization of the working chamber (25) axially displaces the housing to move the lever and disengage the clutch.

13 Claims, 2 Drawing Sheets

CLUTCHES

FIELD OF THE INVENTION

Figure 1:
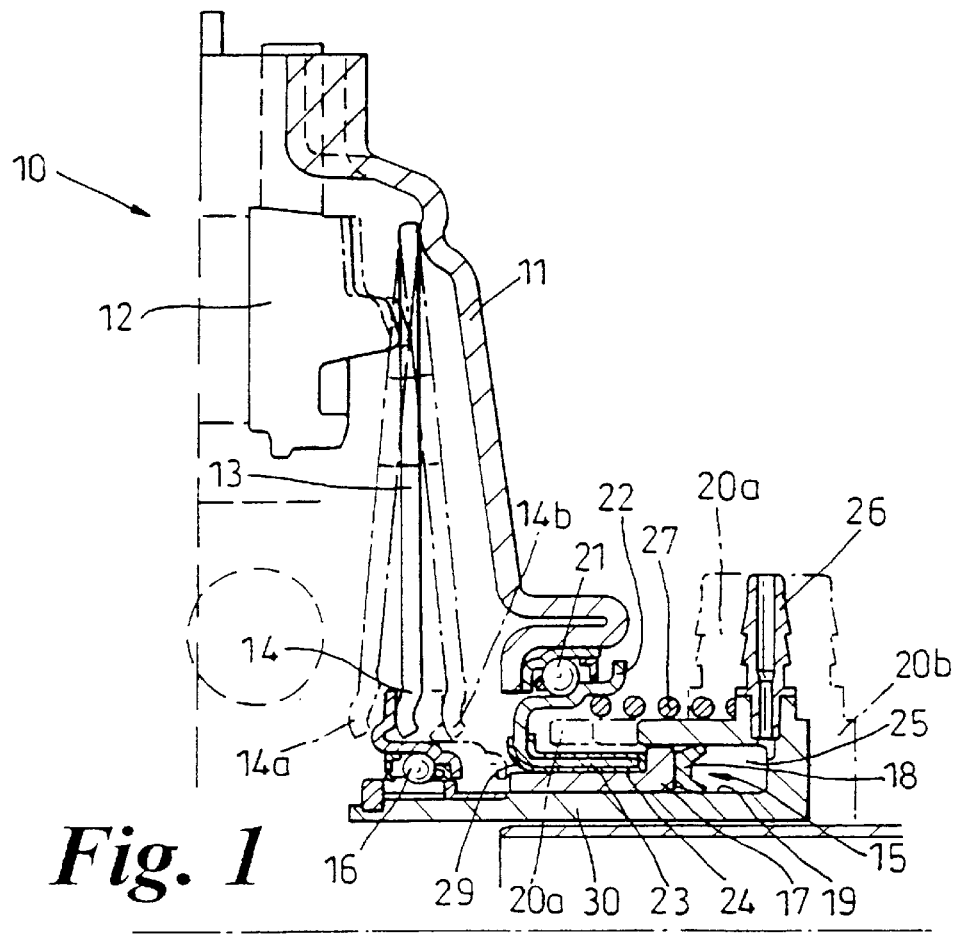

This invention relates to clutches and in particular to vehicle clutches for use in vehicle drivelines to connect a vehicle engine with an associated transmission.

There is a requirement for a compact clutch assembly in which the clutch actuator is mounted on the clutch cover and is isolated, at least to a certain extent, from vibrations emanating from the associated vehicle flywheel.

BRIEF SUMMARY OF THE INVENTION

Thus according to the present invention there is provided a clutch assembly comprising:

a clutch cover, a pressure plate mounted on the cover, spring means biasing the pressure plate away from the cover to engage the clutch, lever means for releasing the clutch, an annular hydraulic slave cylinder mounted on the cover via a support bearing for movement of the lever means to release the clutch, and a vibration isolating means provided between the clutch cover and the slave cylinder.

The vibration isolating means may comprise a polymeric layer interposed between the bearing and the slave cylinder.

The vibration isolating means may comprise a polymeric layer interposed between the bearing and the cover.

The polymeric layer may be provided by coating a race of the support bearing with polymeric material.

A race of the bearing may be provided with an annular flange portion which encircles the axis of rotation of the clutch assembly, said flange being received in a correspondingly shaped recess in an annular piston of the slave cylinder. The polymeric layer may be provided on the annular flange portion.

The annular piston may be slidingly received in an annular bore in a housing of the slave cylinder to define a working chamber, said housing being connected with the lever means via a clutch release bearing so that pressurisation of the working chamber axially displaces the housing to move the lever means and disengage the clutch. The release bearing may be connected with the lever means via a thrust plate.

As will be appreciated the above clutch assembly is particularly compact and also at least partially isolates the slave cylinder from vibrations emanating in the associated vehicle flywheel due to the presence of the layer of polymeric material. This isolation helps to assist in reducing leakage between the piston and the associated annular bore and also jamming of the piston within the bore.

The present invention also provides a clutch assembly comprising:

a clutch cover a pressure plate mounted on the cover, spring means biasing the pressure plate away from the cover to engage the clutch, lever means for releasing the clutch, and an annular hydraulic slave cylinder mounted on the cover within a support bearing, a race of the support bearing being connected with an annular piston of the slave cylinder, said piston being slidably received in an annular bore in a housing of the slave to define a working chamber, said housing being connected with the lever means via a clutch release bearing so that pressurisation of the working chamber axially displaces the housing to move the lever means and disengage the clutch.

Such an assembly may or may not include the vibration isolating means of the first aspect of the invention between the clutch cover and slave cylinder.

The present invention will now be described, by way of example only, with reference to the accompanying drawings in which:

BRIEF DESCRIPTION OF THE INVENTION

Figure 2:
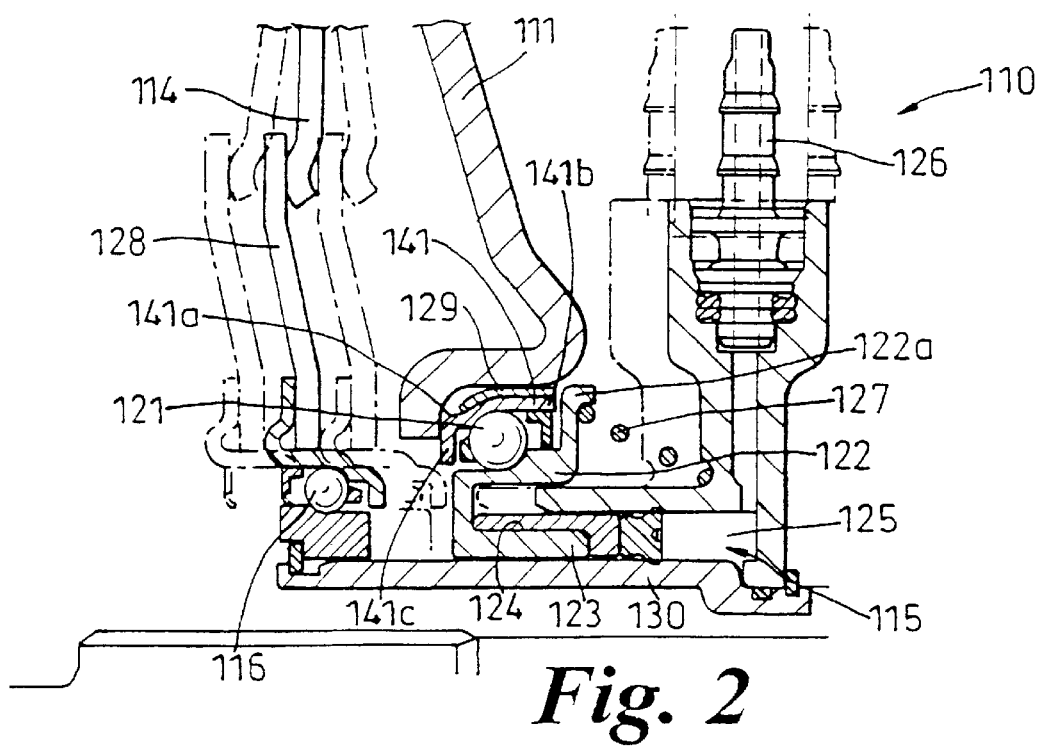
Figure 3:
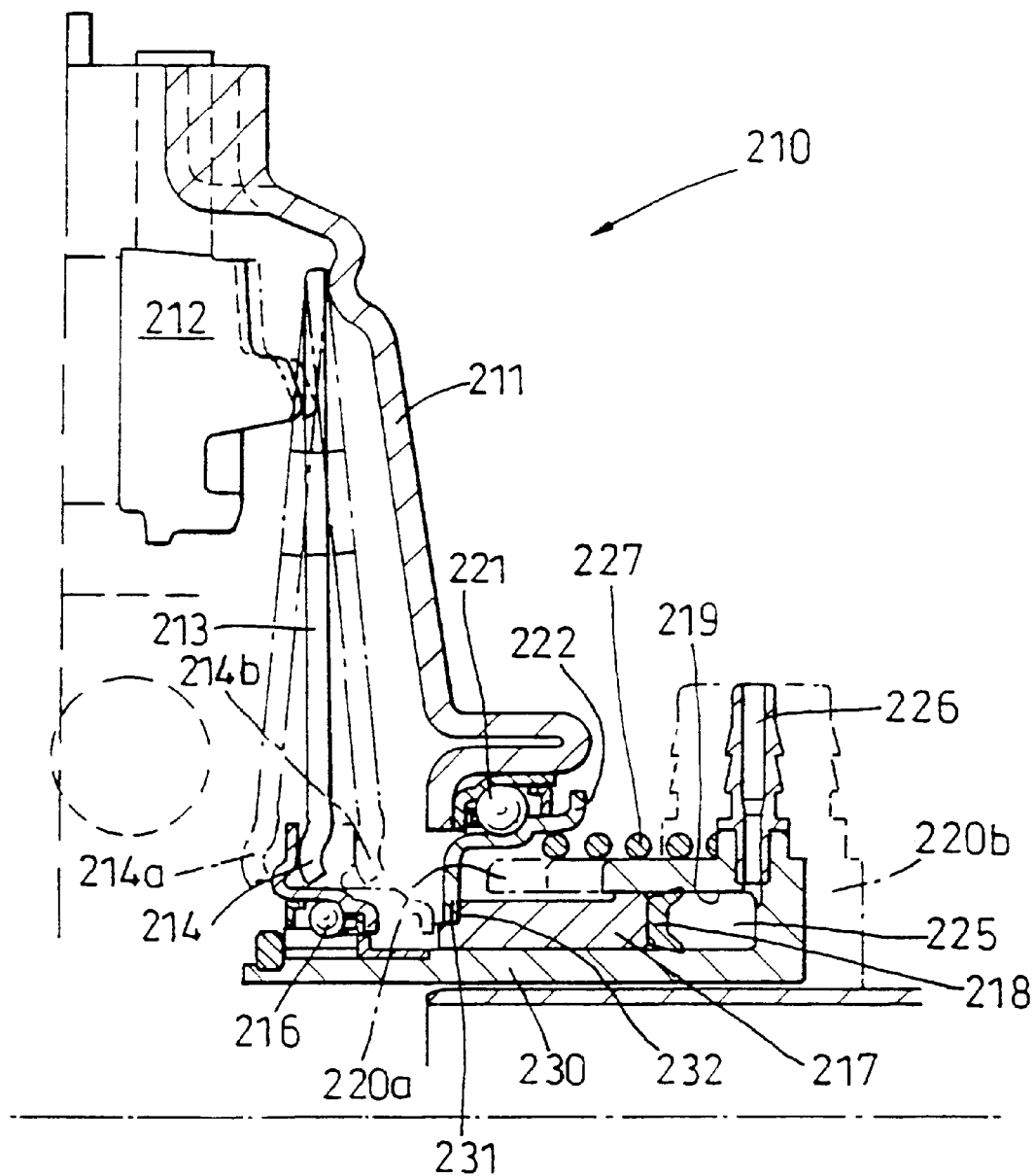

FIG. 1 shows a diagrammatic of section through a clutch assembly including the isolation layer of the present invention, FIG. 2 is a view similar to that of FIG. 1 showing in a larger scale details of a second embodiment of a clutch assembly including the isolation layer of the present invention, and FIG. 3 shows a further form of clutch assembly in accordance with a second aspect of the present invention.

DETAILED DESCRIPTION OF THE INVENTION

Referring to FIG. 1 this shows a clutch assembly 10 having a clutch cover 11, a pressure plate 12 supported from the cover and a diaphragm spring 13 which biases the pressure plate away from the cover towards a driven plate (not shown) which is clamped by the pressure plate against an associated engine flywheel (not shown) to which the cover 11 is secured in a conventional manner. The diaphragm spring has a radially inner portion 14 in the form of conventional finger like levers which are axially displaced by an associated concentric slave cylinder 15 via a release bearing 16.

The concentric slave cylinder 15 comprises an annular piston 17 which carries a seal 18 and which is axially slideable within an annular bore 19 formed in an annular body 20 of the slave cylinder. Piston 17 is supported from cover 11 via a support bearing 21 whose inner race 22 has an axially extending annular flange 23 which is received in a correspondingly shaped cooperating recess 24 in piston 17. Piston 17 thus defines with body 20 a working chamber 25 which may be pressurised via an hydraulic fluid inlet 26. A coil spring 27 acts between body 20 and inner race 22 to tend to extend the concentric slave cylinder and apply an axial preload to the release bearing 16 via the inner wall 30 of body 20.

In accordance with the present invention, the flange 23 of the inner race 22 of bearing 21 is coated with polymeric material such as rubber or thermoplastics as indicated at 29. This polymeric material vibrationally isolates the concentric slave cylinder from vibrations emanating from the associated engine flywheel which would otherwise be transmitted to the concentric slave via the cover 11. This vibrational isolation assists in reducing leakage of fluid from the working chamber 25 around seal 18 since the vibration of this seal is reduced and also reduces any jamming of piston 17 within bore 19 due to vibration. The polymeric material may be a separately moulded part which is pushed onto or otherwise secured to flange 23.

With the clutch engaged the diaphragm finger portions 14 occupy the full line position shown in FIG. 1 as does the body 20. The clutch is disengaged by pressurising working chamber 25 which displaces body 20 to the right relative to axially stationary piston 17 thus drawing the diaphragm fingers 14 to the right via inner wall 30 of body 20. Position 14b of the diaphragm spring fingers and position 20b of body 20 correspond to the fully disengaged position of the clutch and positions 14a and 20a show the finger and body in the engaged position with the clutch fully worn.

As will be appreciated the above arrangement provides a compact slave cylinder arrangement which is completely supported from the clutch cover 11 and also at least partially vibrationally isolated from any vibrations within the cover 11 emanating from the associated flywheel.

FIG. 2 shows a further clutch assembly 110 with features which perform substantially the same function as corresponding features in clutch assembly 10 labelled 100 greater.

Clutch assembly 110 differs from assembly 10 in that the release bearing 116 acts on the diaphragm spring fingers 114 via a torque plate 128. Also the spring 127 is a conical coil spring which is held in position on the inner race 122 of support bearing 121 by an axial projection 122a of the inner race 122. A further difference is that the recess 124 which receives axially extending annular flange 123 of the inner race 222 is formed on the radially inner surface of the piston 117.

In the clutch assembly 110, a layer of polymeric material is not provided on the axially extending annular flange 123 of the inner race, rather a layer of polymeric material 129 is provided between the outer race 141 of support bearing 121 and the cover 111. In the embodiment shown the layer 129 is coated on the radially outer surface 141a of an axially extending portion 141b of outer race 131, whilst a radially extending portion 141c of the inner race directly abuts the cover 111. This arrangement isolates the concentric slave cylinder 115 from radial vibrations transmitted through the cover. Since there is only a relatively light loading between the radially extending portion 141c and the clutch cover 111 when the concentric cylinder 115 is not operating, axial vibrations transmitted through the cover to the radially extending portion 141c will be small compared to the radial vibrations and should not be significantly detrimental to the performance of the concentric slave cylinder 115. However, in an alternative embodiment the isolation layer 129 could extend to cover all contact surfaces between the outer race 131 and the cover 111, though this may result in some lost motion when the concentric slave cylinder 115 is actuated to disengage the clutch. Operation of clutch assembly 110 is the same as clutch assembly 10 shown in FIG. 1 with pressurisation of working chamber 125 resulting in disengagement of the clutch.

FIG. 3 shows a clutch assembly 210 which is somewhat similar to the arrangement shown in FIG. 1 with features which perform substantially the same function as corresponding features in clutch assembly 10 labelled 200 greater.

In the clutch assembly 210, the inner bearing race 222 does not include the axially extending flange portion 223 but simply has a radially extending flange 231 which engages in a recess 232 in the piston 217. This arrangement also does not include any polymeric isolating layer. Operation of this arrangement is also the same as the arrangement shown in FIG. 1 with pressurisation of working chamber 225 resulting in disengagement of the clutch.

Although all the clutch assemblies described above use diaphragm springs it will be appreciated that, for example, coil springs may be used to clamp the pressure plate against the driven plate, these springs being released by separate clutch release levers.

The various assemblies described above may also include a flywheel to which the cover is secured and a driven plate located between the pressure plate and flywheel. The flywheel may be a conventional solid flywheel or a twin-mass flywheel in which the flywheel masses are capable of limited relative rotation against the action of a torsional damping means to damp drive-line vibrations.

Also, the assembly may include a flexplate for the connection of the flywheel (whether solid or twin-mass) to the associated engine crankshaft. The present assembly is particularly suitable for use with a flexplate [a flexible plate connected adjacent its outer periphery to the flywheel and in its central area to the crankshaft which flexes to cushion engine vibration etc.] since the mounting of the actuator on the cover results in the clutch release loads remaining self-contained within the cover assembly and not axially deflecting the flexplate which would cause loss of clutch release travel.

The arrangement of the present invention under which the body 20, 120, 220, is displaced relative to the stationary piston 17, 117, 217, is an important separate inventive concept common to all of the constructions shown in FIGS. 1, 2 and 3 since it allows part of the slave cylinder to be located within the support bearing 21, 121, 221 thus providing a significantly more axially compact assembly.

What is claimed is:

1. A clutch assembly comprising:
   a clutch cover
   a pressure plate mounted on the cover,
   spring means biasing the pressure plate away from the cover to engage the clutch,
   lever means for releasing the clutch,
   an annular hydraulic slave cylinder mounted on the cover via a support bearing for movement of the lever means to release the clutch, and
   a vibration isolating means provided between the clutch cover and the slave cylinder.

2. An assembly according to claim 1 in which the vibration isolating means comprises a polymeric layer interposed between the bearing and the slave cylinder.

3. An assembly according to claim 1 in which the vibration isolating means comprises a polymeric layer interposed between the bearing and the cover.

4. An assembly according to claim 2 in which the polymeric layer is provided on a race of the support bearing.

5. An assembly according to claim 2 in which a race of the support bearing is provided with an annular flange which encircles the axis of rotation of the clutch assembly, said flange being received in a corresponding shaped recess in an annular piston of the slave cylinder.

6. An assembly according to claim 5 in which the polymeric layer is provided on the annular flange.

7. An assembly according to claim 5 in which the piston is slidably received in an annular bore in a housing of the slave to define a working chamber, said housing being connected with the lever means via a clutch release bearing so that pressurisation of the working chamber axially displaces the housing to move the lever means and disengage the clutch.

8. An assembly according to claim 7 in which the release bearing is connected with the lever means by a thrust plate.

9. An assembly according to claim 1 in which the lever means is moved towards the cover to release the clutch.

10. An assembly according to claim 1 in which a race of the support bearing is provided with an annular flange which encircles the axis of rotation of the clutch assembly, said flange being received in a corresponding shaped recess in an annular piston of the slave cylinder.

11. A clutch assembly comprising:

a clutch cover, a pressure plate mounted on the cover, spring means biasing the pressure plate away from the cover to engage the clutch, lever means for releasing the clutch, and an annular hydraulic slave cylinder mounted on the cover within a support bearing, a race of the support bearing being connected with an annular piston of the slave cylinder, said piston being slidably received in an annular bore in a housing of the slave to define a working chamber, said housing being connected with the lever means via a clutch release bearing so that pressurisation of the working chamber axially displaces the housing to move the lever means and disengages the clutch.

12. An assembly according to claim 11 in which the lever means is moved towards the cover to release the clutch.

13. An assembly according to claim 11 including a flywheel and driven plate.

* * * * *